Dec. 20, 1927. 1,653,122

W. A. RAY

AEROPLANE LANDING GEAR

Filed Feb. 4, 1925

INVENTOR
WILLIAM A. RAY.
BY
ATTORNEY

Patented Dec. 20, 1927.

1,653,122

UNITED STATES PATENT OFFICE.

WILLIAM A. RAY, OF HEMPSTEAD, NEW YORK, ASSIGNOR TO CURTISS AEROPLANE & MOTOR CO., INC., A CORPORATION OF NEW YORK.

AEROPLANE LANDING GEAR.

Application filed February 4, 1925. Serial No. 6,697.

My invention relates to landing gears for aircraft and is more particularly concerned with the shock absorbing part or portion thereof.

An object of the invention is to adapt a shock absorber of the compression type to an aeroplane landing gear comprising relatively movable strut sections, said shock absorber being so related to the strut sections that the relative movement thereof is yieldingly resisted by compressing, rather than stretching the shock absorbing means.

A further object of the invention is to so organize the compressible shock absorber with respect to the relatively movable strut sections, that the compression discs which comprise the shock absorbing means per se encircle one of said strut sections, said compression discs being provided with a longitudinal center bore and with appropriate means carried within said bore whereby contact between the shock absorber and the strut is prevented.

A further object of the invention is to so group the parts comprising the shock absorber with respect to the relatively movable strut sections, as to occupy a minimum of space, the shock absorber in its entirety being completely enclosed in a streamline casing, the sides of which are adapted to yield or spread as the shock absorber is compressed. Preferably, the relatively movable strut sections telescopically engage.

Other objects and advantages of the invention will be hereinafter pointed out.

In the drawings, wherein like reference characters denote like or corresponding parts, Fig. 1 is a front elevation of an aeroplane landing gear equipped with a shock absorber characterized as herein set forth;

Figure 1:
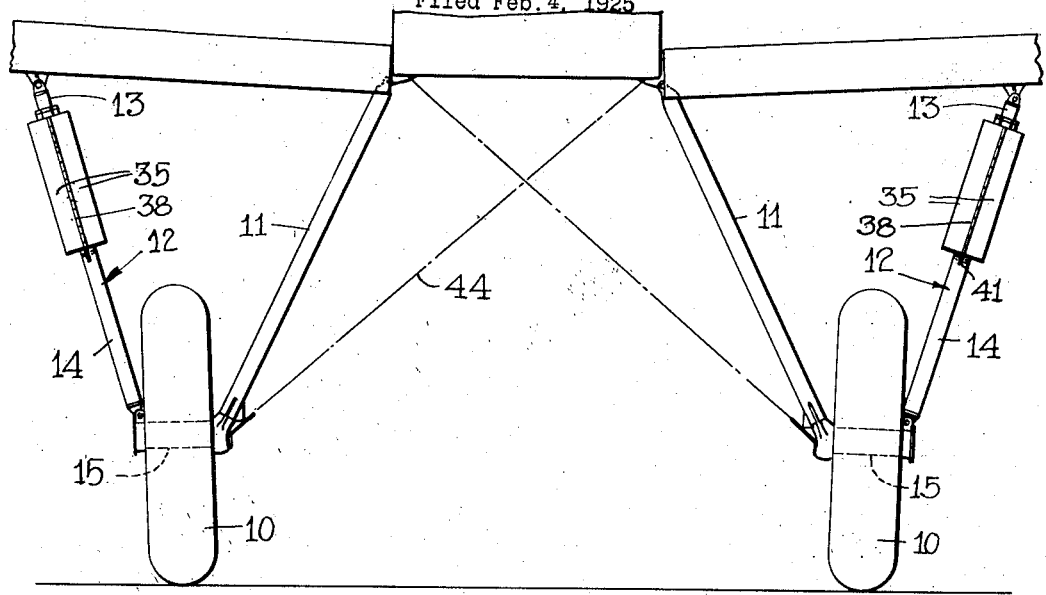
Figure 2:
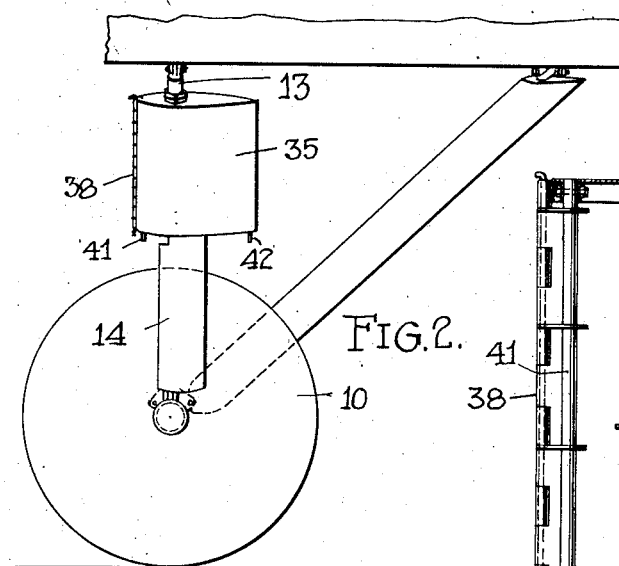
Fig. 2 is a side elevation of the landing gear illustrated in Fig. 1.

In the embodiment of the invention selected for illustration, the wheels of the landing gear are designated as 10. Said wheels 10 are mounted between downwardly convergent struts 11 and 12, the latter or outside struts 12 comprising relatively movable strut sections 13 and 14; said struts at their outer or lower ends supporting axles 15 upon which the wheels 10 of the landing gear are mounted. The struts 11 are pivoted at their upper ends to the aeroplane body and the struts 12 are pivoted at their opposite ends respectively to the wings of the aeroplane and to the axles 15 upon which the wheels 10 are mounted. Thus pivoted and arranged, by resisting the relative movement of the strut sections 13 and 14, the landing shocks are absorbed.

The shock absorber per se includes, in addition to the strut sections 13 and 14, spaced abutments or seats 16 and 17, the seat 16 being preferably adjustable and carried by the strut section 13 near its upper end. Said strut section 13, throughout a portion of its length, is exteriorly threaded as at 18 to provide for the necessary adjustment of the abutment 16. Said abutment 16 is movable longitudinally of the strut section and is held in its adjusted position by a lock-nut arrangement designated as 19.

Figure 3:
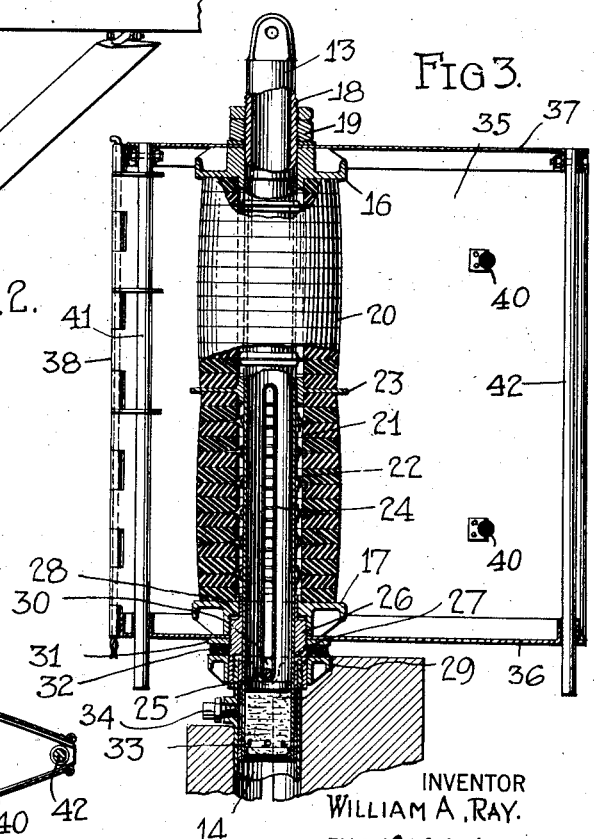
Fig. 3 is a longitudinal sectional view of the shock absorber showing its relation to the telescopically engaging strut sections comprising one of the landing gear struts.
Figure 4:
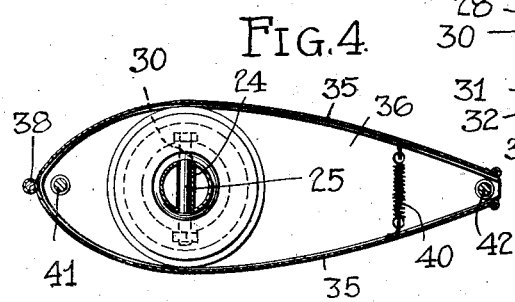
Fig. 4 is a transverse sectional view of the shock absorber.

Between the abutments 16 and 17 a superimposed tier of shock absorber discs 20 are disposed. The said tier of discs 20 bears at one end on the abutment 16 and at its opposite end bears on the abutment 17, the latter abutment (see Fig. 3) being mounted on and fixed with respect to the strut section 14 near its upper end. Said tier of discs 20 is provided with a longitudinal center bore 21, the diameter of which is somewhat larger than the diameter of the strut 13 which is extended thru it. To prevent contact between said tier of discs and the strut section 13, guides 22 are provided, said guides being of annular form and so related to the discs and to the strut as to engage between certain of the former and bear upon said strut. The purpose of the guides 22 is to prevent frictional contact between the discs 20 and the strut. To admit of the desired relative movement between the guides 22 and the strut section 13, said guides are annularly grooved, the grooves in each instance containing a suitable lubricant, such as graphite. Moreover, where it is required that a large number of discs 20 be provided, it is desirable, to avoid buckling of the discs considered as a group, to interpose a spacer 23 between certain of the discs, said spacer being likewise slidable lengthwise the strut section 13 as the discs 20 are compressed.

The strut sections 13 and 14 telescopically engage, and in the embodiment of the invention illustrated, the upper strut section 13 is the female member of the two. At or near its lower end said upper or female strut section 13 is provided with a longitudinal guide slot 24 thru which a cross-pin 25 carried by the lower strut section 14 extends, the engagement between the pin 25 and the ends of the slot being adapted to limit the relative telescopic movement of the sections comprising the strut 12.

The strut section 14, at its upper end, is exteriorly threaded to receive a collar 26 which is adapted to loosely encircle the upper strut section 13. Said collar is provided with an annular shoulder 27 against which the upper end of the lower strut section 14 is adapted to bear. Said collar 26 is also provided with exterior threads for the reception of the fixed abutment 17, said abutment, as well as the collar 26, having complemental shoulders 28 which are adapted to bear one against the other to relieve the threads of all load. As the abutment 17 is fixed, and as the abutment 16 is adjustable, obviously the shock absorber discs 20 may be initially compressed.

To take care of re-bound shocks, a seat or abutment 29 is mounted loosely upon the collar 26. It is held in place thereon by means of the cross-pin 25, said pin, in addition to its passage thru the guide slot 24, being adapted to extend thru comparatively short guide slots 30 formed in the abutment 29 at diametrically opposite points. Between said abutment 29 and a washer 31 threaded on the collar 26, a shock absorber disc 32 is interposed. Said disc 32 is adapted to yieldingly resist movement of the collar 29 and by reason of its location is adapted to absorb all rebound shocks.

As a further means for lubricating the telescopically engaging strut sections, a container 32' is mounted within the strut section 13 at its lower end. Said container is provided with a series of radial apertures 33 which admit of the passage of the lubricant therein contained to the engaging walls of the telescopically engaging strut section, thus admitting, at all times, of the necessary relative movement between said strut sections as the shock absorber is compressed. To replenish the lubricant supply, it is only necessary that a plug 34 be removed.

For the purpose of decreasing the resistance which the shock absorber would otherwise offer, it, the shock absorber, is wholly enclosed in a streamlined housing so formed that the sides 35 thereof may yieldingly separate. In addition to the sides 35, said housing includes end plates 36 and 37, the latter being fixed and the former being movable. Preferably, the end plate 37 is clamped between the abutment 16 and the lock-nut 19, whereas the movable end plate 36 is clamped between the washer 31 and the abutment 17. The sides 35 of the casing are hinged as at 38 at the leading edge of said casing, the hinge axis extending in the direction of the strut length. At the trailing edge, the casing sides 35, instead of being hinged, are merely held together by two or more springs 40 carried on the inside thereof. Such springs 40, should the shock absorber be compressed, yield momentarily; and immediately, should the load applied to the shock absorber be removed, return the casing sides to the normal position. To guide the movable end closure 36 in its relative movement, guide pins 41 and 42 are provided respectively at the leading and the trailing edges of the casing, the pins in each instance being fastened to the fixed end closure 37.

A landing gear characterized as above set forth is especially desirable as an aircraft adjunct in view of its compactness. It may be easily and perfectly streamlined as above explained, and is so organized as to provide for an equal distribution of the landing loads or shocks over the full area of the discs under all conditions of operation. This latter desirable feature is made possible thru the symmetrical grouping of the shock absorber discs about the telescopic landing gear strut. Moreover, as above intimated, the landing gear may be initially compressed to the extent desired by the simple adjustment of one of the abutments between which the shock absorber discs are disposed.

As a means for preventing the collapse of the landing gear, should it be necessary, for any cause, to remove either shock absorber, brace wires 44, cross arranged, can be placed as indicated in Fig. 1. Such wires, however, constitute a purely emergency feature of the landing gear and are not used if and when the shock absorbers are intact.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A shock absorber for aeroplane landing gears including a tier of compressible shock absorber discs, guides for preventing frictional contact between said discs and that portion of the landing gear with which said discs are associated, said guides having pockets formed in their engaging faces for receiving a lubricant.

2. An aeroplane landing gear including relatively movable strut sections, an abutment carried by each strut section, a shock absorber interposed between said abutments, a second abutment carried by one strut section, and means engaging said second abutment to absorb rebound shocks.

3. In an aeroplane landing gear, a compressible shock absorber, and a casing therefor comprising hinged casing sections adapted to yieldingly spread as the shock absorber of the landing gear is compressed.

4. In an aeroplane landing gear, a compressible shock absorber arranged to yieldingly resist relative movement between certain of said landing gear parts, and a stream lined casing enclosing said shock absorber, said casing comprising hinged casing sections adapted to yieldingly spread as the shock absorber is compressed, the hinge axis of the casing sections being coincident with its leading edge.

5. A casing for aeroplane landing gear shock absorbers comprising relatively movable end closures, means maintaining such end closures at all times in alignment and hinged side sections adapted to yieldingly spread as the shock absorber is compressed.

6. An aeroplane landing gear including a pair of mating strut sections adapted to telescopically engage one within the other, each strut section being formed from a single length of metal tubing of substantially constant cross-sectional area throughout, abutments carried, one by each said strut section, to extend laterally out from said telescopic strut, and means encircling said strut and bearing on said abutments to yieldingly resist the telescopic movement of said strut sections.

7. An aeroplane landing gear including a pair of telescopically engaging strut sections, each of a substantially constant cross-sectional area throughout, an abutment carried by each strut section to extend laterally out from the exterior wall thereof, at least one of said two abutments being adjustable lengthwise the strut section upon which it is mounted to vary the distance between two said abutments, and a plurality of rubber discs engaging between said abutments and encircling the telescopic strut to yieldingly resist the relative movement of said strut sections.

8. An aeroplane landing gear including a pair of telescopically engaging strut sections, a fixed abutment carried by one of said strut sections, an abutment adjustably carried by the other of said strut sections in spaced relation to said fixed abutment, said abutments, in each instance, being fastened to said strut section by threaded engagement with the exterior walls thereof, and a yielding means encircling said telescopic strut and bearing at its opposite ends on said abutments to yieldingly resist the telescopic movement of said strut sections.

In testimony whereof I hereunto affix my signature.

WILLIAM A. RAY.